US011849450B2

(12) United States Patent
Seguin

(10) Patent No.: US 11,849,450 B2
(45) Date of Patent: Dec. 19, 2023

(54) METHOD AND COMPUTER DEVICE FOR TRANSMITTING AN INFORMATION STREAM ASSOCIATED WITH A USER DEVICE

(71) Applicant: BOMBARDIER INC., Dorval (CA)

(72) Inventor: Daniel Seguin, Boisbriand (CA)

(73) Assignee: BOMBARDIER INC., Dorval (CA)

( * ) Notice: Subject to any disclaimer, the term of this patent is extended or adjusted under 35 U.S.C. 154(b) by 578 days.

(21) Appl. No.: 16/970,501

(22) PCT Filed: Feb. 18, 2019

(86) PCT No.: PCT/CA2019/050193
§ 371 (c)(1),
(2) Date: Aug. 17, 2020

(87) PCT Pub. No.: WO2019/157601
PCT Pub. Date: Aug. 22, 2019

(65) Prior Publication Data
US 2021/0082289 A1    Mar. 18, 2021

Related U.S. Application Data

(60) Provisional application No. 62/632,160, filed on Feb. 19, 2018.

(51) Int. Cl.
*H04W 36/00* (2009.01)
*H04W 72/20* (2023.01)
*H04W 36/02* (2009.01)

(52) U.S. Cl.
CPC ........... *H04W 72/20* (2023.01); *H04W 36/00* (2013.01); *H04W 36/0009* (2018.08); *H04W 36/023* (2013.01)

(58) Field of Classification Search
CPC ............... H04W 72/20; H04W 36/023; H04W 36/0009; H04W 36/00; H04W 84/005;
(Continued)

(56) References Cited

U.S. PATENT DOCUMENTS 7,023,973 B2    4/2006    Gupta
7,133,669 B2    11/2006   Nair et al.
(Continued)

FOREIGN PATENT DOCUMENTS

EP         3240206 A1      11/2017
JP      2012029278 A  *  2/2012    ........... H04L 1/1621
(Continued)

OTHER PUBLICATIONS

International Search Report with regard to PCT/CA2019/050193 dated May 16, 2019.
(Continued)

*Primary Examiner* — David Q Nguyen
(74) *Attorney, Agent, or Firm* — BCF LLP

(57) ABSTRACT

A method and a networking device for transmitting an information stream are provided. The method is executable by a router. The router and a device are located on-board a vehicle and communicatively coupled by an on-board LAN. The router is communicatively coupled to external systems. The method comprises: establishing a first channel between the device and a first external system by using the on-board LAN; transmitting, via the first channel, the information stream; monitoring decision metrics associated with external systems; identifying a second external system to be prioritized over the first external system; switching from the first to a second channel, the switching being seamless to a user, the switching comprising establishing the second channel between the device and the second external system by using the on-board LAN, storing a portion of the information (Continued)

stream; and transmitting via the second channel, the information stream without interruption during the switching.

22 Claims, 4 Drawing Sheets

(58) Field of Classification Search
CPC .............. H04W 84/12; H04W 27/01; H04W 25/03171; H04W 25/0238; H04W 25/025; H04W 25/03159; H04W 25/022; H04W 2025/03707; H04B 7/005
USPC .............................. 455/436, 437, 439, 438
See application file for complete search history.

(56) References Cited

U.S. PATENT DOCUMENTS

| | | | |
|---|---|---|---|
| 7,519,364 B2 | 4/2009 | Nair et al. | |
| 7,751,814 B2 | 7/2010 | Cruz et al. | |
| 8,606,266 B1 | 12/2013 | Mitchell | |
| 8,737,357 B2 | 5/2014 | Denny et al. | |
| 8,792,880 B2 | 7/2014 | Alcorn | |
| 8,868,074 B2 | 10/2014 | Yu | |
| 8,908,580 B2 | 12/2014 | Shen | |
| 9,369,991 B2 | 6/2016 | Lauer et al. | |
| 9,591,462 B2 | 3/2017 | Lauer et al. | |
| 9,634,753 B2 | 4/2017 | Lauer et al. | |
| 9,681,412 B2 | 6/2017 | Das et al. | |
| 10,574,337 B1* | 2/2020 | Chari | H04B 7/18526 |
| 2004/0078626 A1 | 4/2004 | Li | |
| 2006/0030311 A1 | 2/2006 | Cruz et al. | |
| 2007/0223408 A1 | 9/2007 | Thielke et al. | |
| 2008/0141314 A1* | 6/2008 | Lemond | H04W 36/023 725/76 |
| 2008/0240038 A1* | 10/2008 | Lynch | H04N 21/214 370/331 |
| 2009/0327497 A1 | 12/2009 | Itshaki et al. | |
| 2015/0131519 A1 | 5/2015 | Kanabar et al. | |
| 2015/0327307 A1 | 11/2015 | Randrianasolo et al. | |
| 2016/0029370 A1 | 1/2016 | Hayes et al. | |
| 2016/0080069 A1* | 3/2016 | Horvitz | H04W 40/248 370/316 |
| 2016/0119938 A1* | 4/2016 | Frerking | H04B 7/15507 370/316 |
| 2017/0070939 A1 | 3/2017 | Chong et al. | |
| 2017/0111839 A1 | 4/2017 | Yang | |
| 2017/0164274 A1 | 6/2017 | Petrescu et al. | |
| 2017/0230877 A1 | 8/2017 | Claassen et al. | |
| 2018/0020384 A1 | 1/2018 | Sleight | |

FOREIGN PATENT DOCUMENTS

| | | | | |
|---|---|---|---|---|
| KR | 20090001267 A | | 1/2009 | |
| RU | 2017107967 A | * | 9/2018 | ......... H04B 7/18504 |

OTHER PUBLICATIONS

English Abstract for KR20090001267 retrieved on Espacenet on Aug. 14, 2020.

Gulliver, "More airlines are offering free Wi-Fi for messaging service", https://www.economist.com/blogs/gulliver/2017/10/netsetting, accessed Aug. 14, 2020, pdf 6 pages.

Newman, "JetBlue adds free Wi-Fi, says it can handle streaming video", 2015, https://www.pcworld.com/article/2993487/streaming-media/jetblue-adds-free-wi-fi-says-it-can-handle-streaming-video.html, accessed Aug. 14, 2020, pdf 5 pages.

Inmarsat, "Newsroom", https://www.inmarsat.com/news/vip-aircraft-world-test-flight-demonstrates-seamless-connectivity-global-xpress/, accessed Aug. 14, 2020, pdf 2 pages.

Decision of Rejection with regard to CN201980014268.1 dated Jan. 20, 2023.

* cited by examiner

METHOD AND COMPUTER DEVICE FOR TRANSMITTING AN INFORMATION STREAM ASSOCIATED WITH A USER DEVICE

CROSS-REFERENCE

The present application claims priority from U.S. Provisional Patent Application No. 62/632,160, filed on Feb. 19, 2018, the entirety of which being incorporated herein by reference.

FIELD

The present technology relates to telecommunications and, more particularly, to a method and networking device for transmitting an information stream associated with a user device.

BACKGROUND

It is usual practice to limit use of wireless devices by users on-board passenger vehicles. For example, although passengers of an aircraft are typically allowed to use their wireless devices, such as tablets and smartphones, for surfing the internet while the aircraft is grounded, the use of wireless devices may be prohibited or restricted while the aircraft is operating. In some cases, the use of wireless devices may be prohibited due to interference of signals received and emitted by the wireless devices with the aircraft's systems, for example, communication systems, navigation systems and the like.

In other cases, the use of wireless devices may be allowed, but restricted, during operation of the aircraft. For example, a wireless device may be communicatively coupled to an external network for providing communication thereto and/or therefrom while the aircraft is operating. Generally, a wireless device may be communicatively coupled to (i) an air-to-ground (ATG) network or (ii) a satellite network for transmitting and receiving information while the aircraft is in flight. However, provision of communication to a given wireless device while the aircraft is in flight may be restricted due to a lack of availability of a given network and/or due to poor network access or connectivity.

Availability of an ATG network may depend on a current location of the aircraft and may be affected, for example, by whether the aircraft is flying over a geographical land region (e.g., a continent), where operational ground towers are installed, or whether the aircraft is flying over a geographical water region (e.g., an ocean). In another example, access to a satellite network may be affected by (i) the service provider of the satellite network, (ii) data rate of the satellite network, (iii) the altitude of the aircraft, and the like.

In any case, by prohibiting or restricting usage of wireless devices to which they are accustomed, passengers may be deprived of their normal service subscriptions as well as their device's personalized features, such as particular applications that given passengers find useful. There is a need, therefore, for improvements that will allow a convivial use of wireless devices while on-board an operating vehicle such as a flying aircraft.

SUMMARY

Developers of the present technology have appreciated certain technical drawbacks associated with the existing communication systems on-board operating vehicles. One of the drawbacks of conventional communication systems is that a passenger may need to access manually via its user device different local area networks (LAN) to access different functions and different external networks. For example, a first LAN available for the device enables control for controlling some functions of a vehicle, such as lights and temperature, while a second LAN available for the device enables access to the internet, while a third LAN available for the device enables "Text & Talk" capabilities of the device. This exclusivity of functions via distinct LANs available to the device may force the user to manually connect to a first LAN to use a first set of functionalities, then manually disconnect from the first LAN, then manually connect to a second LAN to use a second set of functionalities, then manually disconnect from the second LAN, then manually connect to the third LAN to use a third set of functionalities.

It is an object of the present technology to improve at least some of the inconveniences present in the prior art. Developers of the present technology considered a system that implements a full integration of communication capabilities with at least some systems on-board the operating vehicle and at least some systems that are hosted outside the operating vehicle. As such, the user may no longer require, in some implementations of the present technology, to manually connect and disconnect its device to and from various LANs for using various sets of functionalities available for the user. Additionally or alternatively, there is envisioned a communication system which is able to switch provision of communication from various external systems in a seamless manner for a user of a device connected locally to the communication system.

In a first broad aspect of the present technology, there is provided a method of transmitting an information stream associated with a user device. The method is executable by a router. The router and the user device are located on-board a vehicle and are communicatively coupled by an on-board local area network. The router is further communicatively coupled to a plurality of external data source systems and a storage. The method comprises establishing, by the router, a first communication channel between the user device and a first one of the plurality of external data source systems by using the on-board local area network. The method comprises transmitting, by the router via the first communication channel, the information stream associated with the user device. The method comprises monitoring, by the router, a plurality of decision metrics for the plurality of external data source systems. The plurality of decision metrics are indicative of a priority parameter for each one of the plurality of external data source systems. The method comprises identifying, by the router, a second one of the plurality of external data source systems based on the priority parameters. The second one of the plurality of external data source systems is to be prioritized over the first one of the plurality of external data source systems for transmitting the information stream. The method comprises switching, by the router, from the first communication channel to a second communication channel for transmitting the information stream. The switching is seamless to a user of the user device. The switching comprises (i) establishing, by the router, a second communication channel between the user device and the second one of the plurality of external data source systems by using the on-board local area network and (ii) storing, by the router, at least a portion of the information stream in the storage. The method comprises transmitting, by the router via the second communication channel instead of via the first communication channel, the information stream such that the information stream is uninterrupted during the switching from the first communication channel to the second communication channel.

In some implementations of the method, the method further comprises computing, by the router, the respective priority parameter for each one of the plurality of external data source systems based on respective values of the plurality of decision metrics. The respective priority parameter is a weighted sum of the respective values of the plurality of decision metrics.

In some implementations of the method, the identifying the second one of the plurality of external data source systems based on the priority parameters comprises (i) ranking, by the router, each one of the plurality of external data source systems based on the respective priority parameter and (ii) selecting, by the router, a top ranked external data source system as the second one of the plurality of external data source systems.

In some implementations of the method, the at least the portion of the information stream stored in the storage is used, by the router, for the transmitting the information stream via the second communication channel instead of via the first communication channel such that the information stream is uninterrupted during the switching from the first communication channel to the second communication channel.

In some implementations of the method, the method further comprises (i) establishing, by the router, a local communication channel between the user device and a on-board management system by using the on-board local area network and (ii) transmitting, by the router via the local communication channel, instructions provided by the user for controlling at least one functionality of the vehicle.

In some implementations of the method, the on-board local area network is a Wifi network provided on-board of the vehicle.

In some implementations of the method, the plurality of external data source systems comprises at least one external data source system being of a ground-type and at least one other external data source system being of a satellite-type.

In some implementations of the method, the at least the portion of the information stream is a pre-determined volume of the information stream.

In some implementations of the method, the plurality of decision metrics comprises at least one of: a data rate metric, a connection strength metric and an operation range metric.

In some implementations of the method, the method further comprises monitoring, by the router, a plurality of other decision metrics associated with the vehicle. The plurality of decision metrics and the plurality of the other decision metrics are indicative of the respective priority parameter for each one of the plurality of external data source systems.

In some implementations of the method, the plurality of the other decision metrics comprises at least one of: an altitude of the vehicle and a geographical region of the vehicle.

In a second broad aspect of the present technology, there is provided a networking device for transmitting an information stream associated with a user device. The networking device and the user device are located on-board a vehicle and are communicatively coupled by an on-board local area network. The networking device is further communicatively coupled to a plurality of external data source systems and to a storage storing configuration files. When the networking device executes the configuration files, the networking device is configured to establish a first communication channel between the user device and a first one of the plurality of external data source systems by using the on-board local area network. The networking device is configured to transmit, via the first communication channel, the information stream associated with the user device. The networking device is configured to monitor a plurality of decision metrics for the plurality of external data source systems. The plurality of decision metrics is indicative of a priority parameter for each one of the plurality of external data source systems. The networking device is configured to identify a second one of the plurality of external data source systems based on the priority parameters. The second one of the plurality of external data source systems is to be prioritized over the first one of the plurality of external data source systems for transmitting the information stream. The networking device is configured to switch from the first communication channel to a second communication channel for transmitting the information stream. The switching is seamless to a user of the user device. The networking device configured to switch is also configured to: (i) establish a second communication channel between the user device and the second one of the plurality of external data source systems by using the on-board local area network and (ii) store at least a portion of the information stream in the storage. The networking device is configured to transmit, via the second communication channel instead of via the first communication channel, the information stream such that the information stream is uninterrupted during the switching from the first communication channel to the second communication channel.

In some implementations of the network device, the networking device is further configured to compute the respective priority parameter for each one of the plurality of external data source systems based on respective values of the plurality of decision metrics. The respective priority parameter is a weighted sum of the respective values of the plurality of decision metrics.

In some implementations of the network device, the networking device configured to identify the second one of the plurality of external data source systems based on the priority parameters is further configured to: (i) rank each one of the plurality of external data source systems based on the respective priority parameter and (ii) select a top ranked external data source system as the second one of the plurality of external data source systems.

In some implementations of the network device, the networking device is configured to use the at least the portion of the information stream stored in the storage for transmitting the information stream via the second communication channel instead of via the first communication channel such that the information stream is uninterrupted during switching from the first communication channel to the second communication channel.

In some implementations of the network device, the networking device is further configured to: (i) establish a local communication channel between the user device and a on-board management system by using the on-board local area network and (ii) transmit, via the local communication channel, instructions provided by the user for controlling at least one functionality of the vehicle.

In some implementations of the network device, the on-board local area network is a Wifi network provided on-board of the vehicle.

In some implementations of the network device, the plurality of external data source systems comprises at least one external data source system being of a ground-type and at least one other external data source system being of a satellite-type.

In some implementations of the network device, the at least the portion of the information stream is a pre-determined volume of the information stream.

In some implementations of the network device, the plurality of decision metrics comprises at least one of: a data rate metric, a connection strength metric and an operation range metric.

In some implementations of the network device, the networking device is further configured to monitor a plurality of other decision metrics associated with the vehicle. The plurality of decision metrics and the plurality of the other decision metrics are indicative of the respective priority parameter for each one of the plurality of external data source systems.

In some implementations of the network device, the plurality of the other decision metrics comprises at least one of: an altitude of the vehicle and a geographical region of the vehicle.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
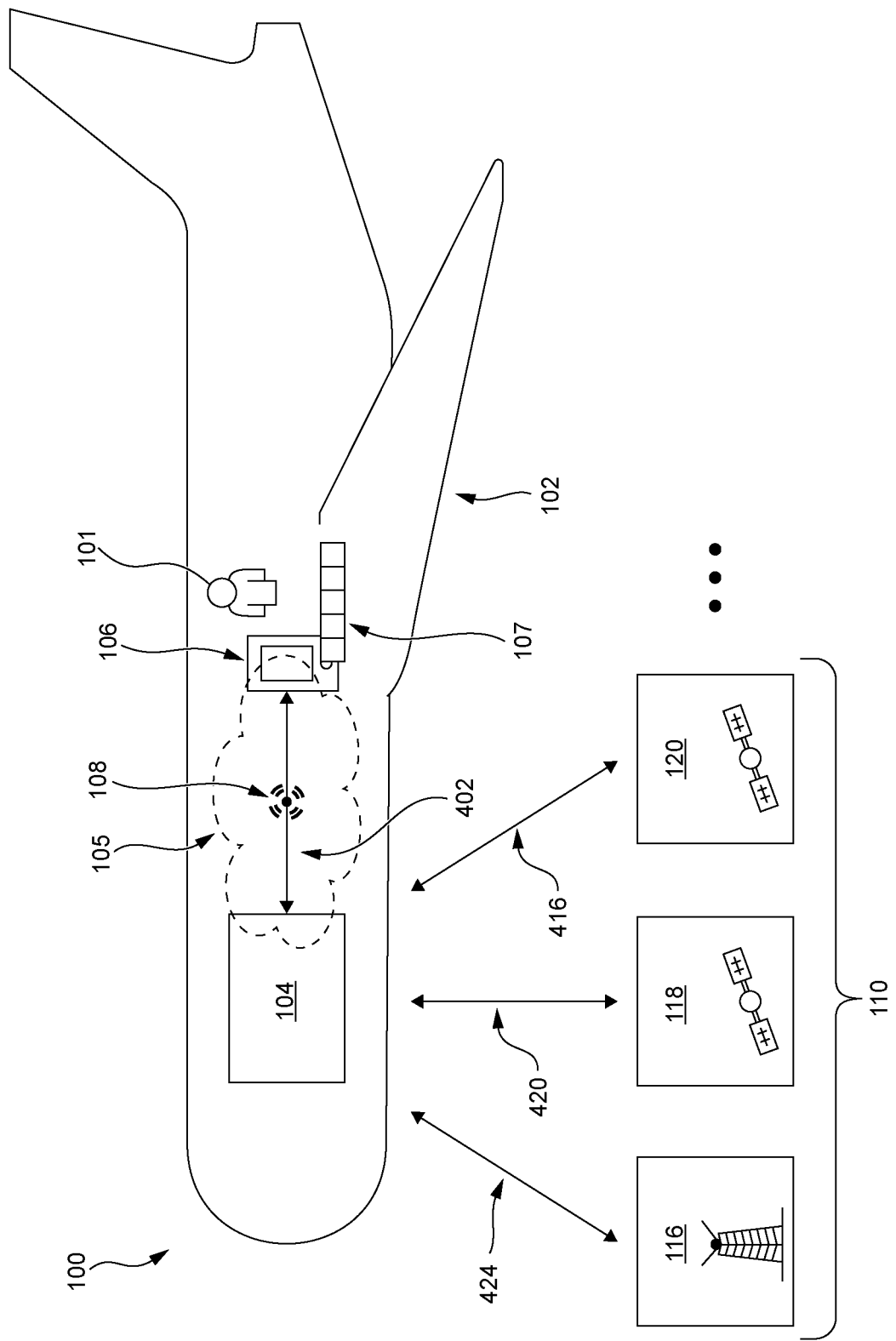
FIG. 1 depicts a schematic representation of a system 100 for transmitting an information stream associated with a device on-board a vehicle according to some implementations of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide, in certain instances, simple implementations of the present technology, and that, where such is the case, they have been presented in this manner as an aid to understanding. As persons skilled in the art would understand, various implementations of the present technology may be of a greater complexity.

The system 100 comprises an on-board communication system 104 of a vehicle 102, a device 106 (associated with a user 101) located on-board the vehicle 102 as well as a plurality of external data source systems 110. The on-board communication system 104 is configured to provide communication between (i) the plurality of external data source systems 110, (ii) an on-board management system 204 (see FIG. 2) of the vehicle 102 and (iii) the device 106 and/or other potential devices located on-board the vehicle 102.

The on-board communication system 104 is a "fully integrated" communication system which, generally speaking, integrates communication capabilities of the plurality of external data source systems 110 (and other potential data source systems) together with the on-board management system 204 and an on-board local area network 105 for transmitting information to and/or from the device 106.

It is contemplated that the on-board communication system 104 may be configured to identify which one of the plurality of external data source systems 110 is a most suitable external data source system for providing communication to and/or from the device 106. How the on-board communication system 104 is configured to identify the most suitable external data source system will become apparent from the description below.

External Data Source Systems

The plurality of external data source systems 110 are disposed and hosted externally to the vehicle 102. The plurality of external data source systems 110 may provide data communication for the device 106. However, it is contemplated that at least some of the external data source systems 110 may provide other types of communication such as, for example, cellular communication without departing from the scope of the present technology.

Also, each one of the plurality of external data source systems 110 support wireless communications and may be communicatively coupled to the on-board communication system 104. In other words, the on-board communication system 106 may be capable of establishing wireless communication links 424, 420 and 416 with external data source systems 116, 118 and 120, respectively, of the plurality of external data source systems 110. How the on-board communication system 110 may establish the wireless communication links 424, 420 and 416 will be described further below.

For example, the external data source system 116 may be a ground-type data source system. The external data network 116 may support wireless communication one or more ground towers (and one or more ground servers) dedicated for generating radio waves at a particular frequency spectrum, such as at frequencies of about 950 MHz, for example, for providing communication to the on-board communication system 104. Therefore, it is contemplated that at least one of the plurality of external data source systems 110 may provide wireless communication via ground towers. Put another way, at least some components of the on-board communication system 104 and the external data source system 116 may be part of or form an air-to-ground (ATG) data communication system.

In another example, an external data source system 118 may be a first satellite-type data source system. The external data source system 118 may support wireless communication via one or more satellites dedicated for generating radio waves at frequencies in the Swift Broad Band (SBB) spectrum. Put another way, at least some components of the on-board communication system 104 and the external data source system 118 may be part of or form a satellite communication (SATCOM) data system.

In yet another example, an external data source system 120 may be a second satellite-type data source system. The external data source system 120 may support wireless communication via one or more satellites dedicated for generating radio waves at frequencies in the Ka band spectrum. Therefore, it is contemplated that at least one other of the plurality of external data source systems 110 may provide wireless communication via one or more satellites. Put another way, at least some components of the on-board communication system 104 and the external data source system 120 may be part of or form another SATCOM data system.

It is contemplated that the frequency spectrum associated with a given external data source system may influence the selection, by the on-board communication system 104, of the given external data source system instead of another given external data source system for providing communication for the device 106.

Each one of the plurality of external data source system 110 may have a respective range of delivery or operation. For example, the external data source system 116 (e.g., ground-type data source system) may have a shorter range of delivery or operation than the external data source systems 118 and 120. The range of a given ground-type data source system is usually limited to proximity with ground towers (which are typically installed on land) while a given satellite-type data network may provide a world wide coverage (including coverage over water).

It is contemplated that the range of delivery or operation associated with a given external data source system may influence the selection, by the on-board communication system 104, of the given external data source system instead of another given external data source system for providing communication for the device 106. It is also contemplated that each one of the plurality of external data source systems 110 may utilize or support various protocols for providing communication.

Each one of the plurality of external data source systems 110 may provide communication to the on-board communication system 104 at respective data rates. For example, the external data source system 116 may provide communication to the on-board communication system 104 at a data rate of about 6 Mbps. In another example, the external data source system 118 may provide communication to the on-board communication system 104 at a data rate of about 300 Kbps. In yet a further example, the external data source system 120 may provide communication to the on-board communication system 104 at a data rate of about 6 to 10 Mbps.

It is contemplated that the data rate at which a given external data source system may provide communication to the on-board communication system 104 may depend inter alia on a type of the given external data source system, such as whether the given external data source system is of a ground-type or satellite-type. It is also contemplated that the data rate associated with a given external data source system may influence the selection, by the on-board communication system 104, of the given external data source system instead of another given external data source system for providing communication for the device 106.

It is contemplated that a connection strength between the on-board communication system 104 and any one of the plurality of external data source systems 110 may vary over time. For example, the connection strength may vary depending on the weather, geographical region over which the vehicle 102 is operating, geometry of the vehicle 102, altitude of the vehicle 102 and the like. It should be noted that other factors may influence the connection strength between the on-board communication system 104 and each one of the plurality of external data source systems 110 without departing from the scope of the present technology.

It is contemplated that the connection strength of a given external data source system may influence the selection, by the on-board communication system 104, of the given external data source system instead of another given external data source system for providing communication for the device 106.

The plurality of external data source systems 110 may be maintained and/or operated by a same or different service providers. Generally speaking, a given service provider can be an entity that delivers services to one or more users that access their data source systems via devices. These services may comprise but are note limited to: data services, cellular services, other digital services and the like. For example, the user 101 of the device 106 may be a subscriber to one or more services provided by the one or more service providers maintaining and/or operating the plurality of external data source systems 110.

It is contemplated that the service provider of a given external data source system or the user 101 being a subscriber to services of the service provider may influence the selection, by the on-board communication system 104, of the given external data source system instead of another given external data source system for providing communication for the device 106.

It is contemplated that having access to or otherwise receiving services via a given one of the plurality of external data source systems 110 may be provided by a given service provider in exchange for a subscription fee to be paid or pre-paid by the user 101. It should be understood that an amount of subscription fees for services provided by the given service provider may vary from one to another one of the plurality of external data source systems 110.

For example, subscription fees associated with the external data source system 116 may be inferior to the subscription fees associated with the external data source system 118 and/or to the subscription fees associated with the external data source system 120. It is contemplated that the subscription fees associated with a given external data source system may influence the selection, by the on-board communication system 104, of the given external data source system instead of another given external data source system for providing communication for the device 106.

It should be understood that, although the plurality of external data source systems 110 is depicted as comprising only three external data source systems, the plurality of external data source systems 110 may comprise less than or more than three external data source systems such as two, four, five or ten external data source systems, for example, without departing from the scope of the present technology. A number of external data source systems that may be communicatively coupled with the on-board communication system 104 will depend inter alia on various implementations of the present technology.

Vehicle

The device 106 and the user 101 associated therewith are transported, on-board or otherwise located within the vehicle 102 while the vehicle 102 is operating. In some embodiments of the present technology, the vehicle may be owned and/or operated by an individual, a company, an organization or governmental entity. The vehicle 102 may be human-operated or an operator-less vehicle. It is contemplated that the vehicle 102 may be part of a fleet of vehicles for transporting passengers, such as the user 101 and other potential passengers, and/or inanimate cargo, such as mail, for example.

It should be understood that, although the vehicle 102 is depicted in FIG. 1 as an aircraft, at least some embodiments of the present technology may be implemented with other types of vehicles. For example, the vehicle 102 may be (i) a watercraft such as a boat or ship, (ii) a rail-road vehicle such as a train or subway car, (iii) an automobile such as a car, truck or bus, and (iv) another type of aircraft such as a helicopter. It is also contemplated that the vehicle 102 may be implemented as any other air-borne, water-borne, land-borne or space-borne vehicle without departing from the scope of the present technology.

The vehicle 102 may comprise a compartment for transporting the user 101 (as well as other potential passengers and/or cargo), such as a cabin of an airplane, for example. It is contemplated that the user 101 may be enabled to control various functionalities of the vehicle 102 such as, but not limited to: operating the vehicle 102, turning on/off lights, selecting and/or playing a movie and/or a song, increasing/decreasing temperature, actuating various components and the like.

It is contemplated that the vehicle 102 is equipped with and provides power to the on-board communication system 104. In some embodiments of the present technology, it is contemplated that the device 106 may be communicatively coupled to the on-board communication system 104 while on-board the vehicle 102. The user 101 may control at least some of the functionalities of the vehicle 102 through the device 106 while the device 106 is communicatively coupled to the on-board communication system 104 of the vehicle 102.

It is contemplated that selection by the on-board communication system 104 of the on-board management system 204 (see FIG. 2) instead (or simultaneously) of a given one of the plurality of external data source systems 110 for controlling at least some functionalities of the vehicle 102 may be influenced by whether or not the user 101 is desirous to control the at least one of the at least some functionalities of the vehicle 102 via the device 106 without departing from the scope of the present technology. How the user 101 may control the at least some functionalities of the vehicle 102 via the device 106 will be described in greater detail further below.

Device Associated with User

The implementation of the device 106 is not particularly limited, but as an example, the device 106 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 106 can sometimes be referred to as an "electronic device", "end user device", "client electronic device" or simply "device". It should be noted that the fact that the device 106 is associated with the user 101 does not need to suggest or imply any mode of operation—such as a need to log in, a need to be registered, or the like.

It is contemplated that the device 106 comprises hardware and/or software and/or firmware (or a combination thereof), as is known in the art, in order to execute a plurality of applications 107. Generally speaking, a given application is a computer program that is instrumental in performing functions, tasks, activities and the like by the device 106 for the benefit of the user 101 or that the user 101 may find useful.

For example, the plurality of applications 107 may comprise, but is not limited to: a given web browser such as Google Chrome™ for enabling the user 101 to surf the Internet, a Lufthansa Technik™ application for enabling the user 101 to control the at least some of the functionalities of the vehicle 102, GoGo Text&Talk™ application and/or GLOVAL VT™ application for enabling the user 101 to place voice calls and/or send/receive text messages, Satcom Direct™ application for enabling the user 101 to monitor a status of the on-board communication system 104, and the like. It should be noted that the plurality of applications 107 may comprise additional applications to those non-exhaustively listed above without departing from the scope of the present technology.

As previously alluded to, in order to perform the at least some functions, tasks, activities and the like of the plurality of applications 107, the device 106 may need to be communicatively coupled with the on-board communication system 104.

In the illustrative example of the system 100, the device 106 is communicatively coupled to the on-board communication system 104. For example, the device 106 and the on-board communication system 104 may be communicatively coupled through the on-board local area network 105. In other words, the device 106 may be configured to establish a communication link 402 with the on-board communication system 104 via a network access point 108. How the communication link 402 between the device 106 and the on-board communication system 104 is implemented will depend inter alia on how the device 106 is implemented.

Merely as an example and not as a limitation, in those embodiments of the present technology where the device 106 is implemented as a wireless communication device (such as a smartphone) and where the on-board local area network 105 is a wireless local area network, the communication link 402 can be implemented as a wireless communication link such as but not limited to a WiFi® communication link. In other words, the network access point 108 may be a wireless access point and the device 106 may be wirelessly connected thereto for establishing the communication link 402 with the on-board communication system 104. In those examples where the device 104 is implemented as a notebook computer, the communication link 402 can be either wireless (such as WiFi®) or wired (such as an Ethernet wired based connection).

It should be understood that, for ease of illustration only, only the device 106 and the on-board communication system 104 are connected to the on-board local area network 105. However, it is contemplated that other potential devices may be connected to the on-board local area network 105 via the network access point 108, for example, without departing from the scope of the present technology.

On-Board Communication System

Figure 2:
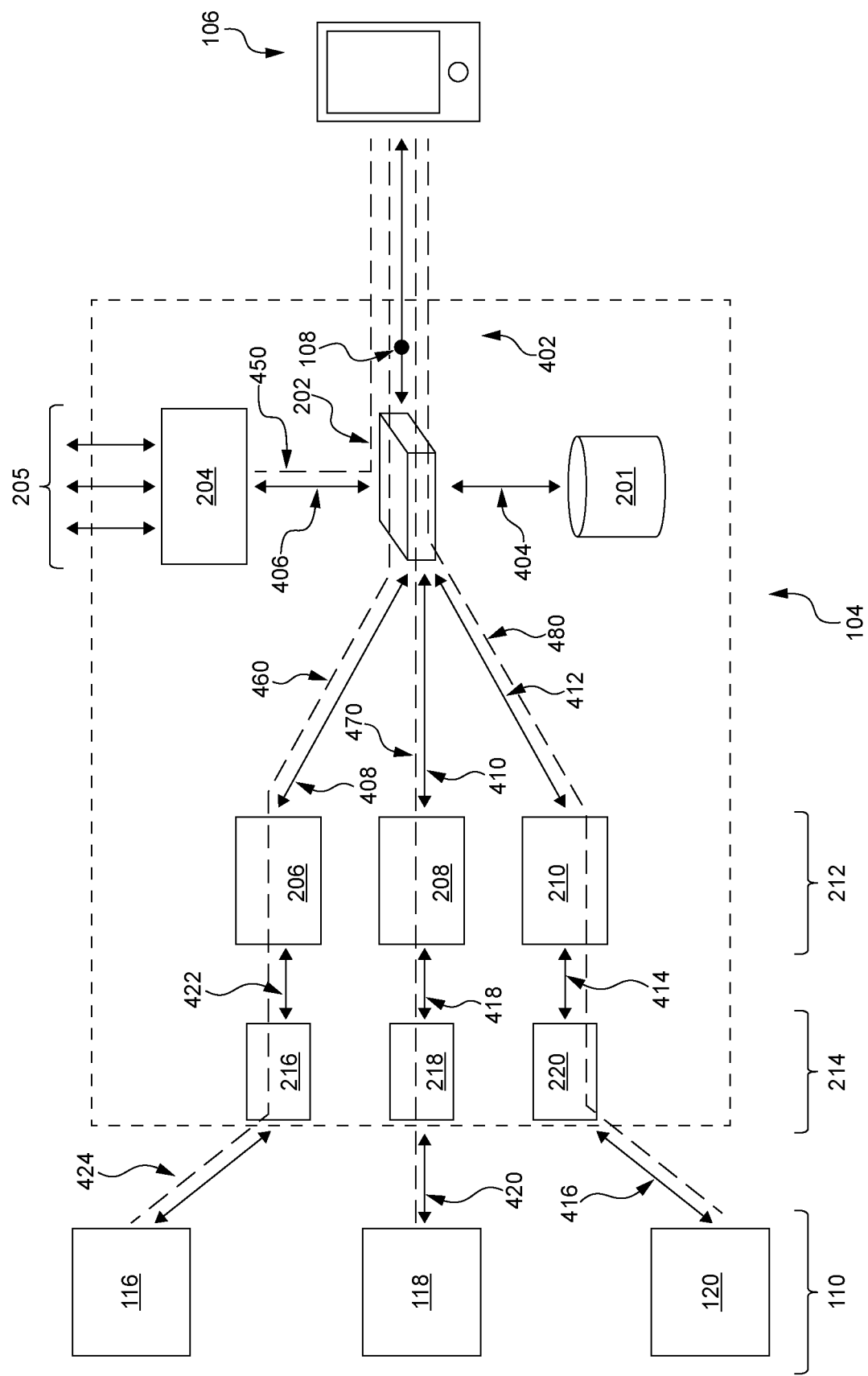
FIG. 2 depicts a schematic representation of a on-board communication system of FIG. 1 of the vehicle according to some implementations of the present technology.

With reference to FIG. 2, a schematic representation of at least some components of the on-board communication system 104 is depicted. The on-board communication system 104 comprises a router 202. Generally speaking, a router is a networking device that is configured to forward information, in a form of data packets for example, between and/or within various network systems. In other words, a given router is configured to perform information traffic direction functions between and/or within various network systems. When information is received by the given router, the information is analyzed and may be transmitted in order to be received by a destination node of a given network.

The router 202 comprises a plurality of ports for connecting thereto a plurality of network systems. For example, in a non-limiting illustration of FIG. 2, the router 202 is communicatively coupled with a plurality of transceivers 212 (via communication links 408, 410 and 412), the network access point 108, a storage device 201 (via a communication link 404) and the on-board management system 204 (via a communication link 406).

Generally speaking, the router 202 of the on-board communication system 104 is configured to (i) establish various communication channels for providing communication for the device 106, (ii) transmit or direct information streams associated with the device 106, (iii) monitor various decision metrics for the plurality of external data source systems 110 and/or for the vehicle 102, (iv) prioritize external data source systems from the plurality of external data source systems 110 for transmitting information streams associated with the device 106 and (v) switching between two or more communication channels for transmitting information streams associated with the device 106. How at least some of the above non-exhaustively listed functionalities of the router 202 are executed by the router 202 will be described in greater detail further below.

It should be noted that in some embodiments of the present technology, the router 202 may be configured to switch between various communications channels for transmitting information streams associated with the device 106 in a "seamless" manner. In other words, the user 101 may not be aware that the router 202 switches between various communication channels for providing communication for the device 106. It is also contemplated that the router 202 may be configured to switch between various communication channels during transmission of a given information stream without interruption of the given information stream. How the router 202 is configured to seamlessly switch between communication channels for transmitting information streams and uninterruptedly transmit a given information stream during the seamless switching of communication channels will become apparent from the description below.

As previously mentioned, the router 202 is communicatively coupled with a storage device 201 via the communication link 404. Although the storage device 201 is depicted in FIG. 2 as being a separate entity that is external to the router 202, it should be noted that in some embodiments of the present technology, the storage device 201 may be integrated with the router 202 as an internal storage device of the router 202 without departing from the scope of the present technology.

Generally speaking, the storage device 201 may receive information from the router 202 which was extracted or otherwise determined, monitored or generated by the router 202 during operation for temporary and/or permanent storage thereof and may provide stored information to the router 202 for use thereof.

In some embodiments of the present technology, the storage device 201 is also configured to store information that is provided thereto by developers of the on-board communication system 104 for executing at least some functionalities of the router 202.

For example, the information provided by the developers of the on-board communication system 104 may comprise an external-data-source-system-monitoring algorithm for monitoring a plurality of decision metrics associated with the plurality of external data source systems 110. It is contemplated that the information provided by the developers of the on-board communication system 104 may also comprise a vehicle-monitoring algorithm for monitoring a plurality of decision metrics associated with the vehicle 102.

In another example, the information provided by the developers of the on-board communication system 104 may comprise a communication-channel-prioritization algorithm for prioritizing external data source systems of the plurality of external data source systems 110 for transmission of information streams associated with the device 106.

In yet a further example, the information provided by the developers of the on-board communication system 104 may comprise configuration files for configuring the router 202 to execute at least some of the functionalities of the router 202. Generally speaking, configuration files are computer files that are used to configure various parameters or settings of a computer program running a computer device. In this case, the configuration files provided by the developers of the on-board communication system 104 may be used for configuring applications, processes and operating system settings of the router 202.

For example, the configuration files may comprise inter alia vehicle serial number, external data source system priority listing instructions, assignment instructions of ethernet ports and connection types to various external data source systems, setup instructions for wireless connectivity, setup instructions for identification and password for wireless connectivity, and the like. It should be noted that the configuration files may comprise at least some of the above non-exhaustive list of information types and at least some addition information types without departing from the scope of the present technology.

It is contemplated that the storage 201 may also store a wide area network management algorithm, a local area network distribution algorithm. The router 202 may comprise a modem and a plurality of ethernet ports and a power supply. The router 202 may be RTCA-DO160G compliant to be certified for aircraft usage. The router 202 may also operate in a normal mode or in a client mode. For example, when the router 202 operates in client mode, at least some of the software of the router may be updated periodically and/or at predetermined moments in time though a connection to an on-ground network.

How the storage device 201 is implemented is not particularly limiting but, as examples, the storage device 201 may be implemented as a medium of any nature and kind whatsoever, including RAM, ROM, disks (CD-ROMs, DVDs, floppy disks, hard drivers, etc.), USB keys, solid state-drives, tape drives, etc. and also any combination thereof. It should be noted that an implementation of the communication link 404 may depend inter alia on how the storage device 201 is implemented.

As previously mentioned, the router 202 of the on-board communication system 104 is communicatively coupled to the on-board management system 204 via the communication link 406. In an embodiment where the vehicle 102 is an aircraft, the on-board management system 204 may be a Cabin Management System (CMS).

Generally speaking, the on-board management system 204 may control various sub components inside the vehicle 102. For example, the on-board management system 204 may control lights, various media libraries (such as music and movie libraries, for example), internal temperature and the like. As such, the on-board management system 204 may provide a plurality of wired communication links 205, such as Ethernet type communication links, for example, for connecting various sub components thereto. For example, a BlueRay™ player, various on-board displays, sound systems, various lights and the like may be connected to the on-board management system 204 via the plurality of wired communication links 205 for enabling control thereof via the on-board management system 204.

Optionally, an auxiliary network access point (not depicted) may be communicatively coupled to the on-board management system 204 by a given one of the plurality of wired communication links 205 for connecting the device 106 to the on-board local area network 105. When the network access point 108 is defective or otherwise not operational, the user 101 may connect the device 106 to the auxiliary network access point for communicatively coupling the device 106 with the on-board local area network 105 (i.e., for establishing a communication link between the router 202 and the device 106 not via the network access point 108).

It should be noted that the on-board management system 204 may be associated with a given application that enables the user 101 of the device 106 to control at least some sub components inside the vehicle 102 when the device 106 is communicatively coupled with the on-board management system 204 via the on-board local area network 105.

As previously mentioned, the router 202 is also communicatively coupled with the plurality of transceivers 212 via the communication links 408, 410 and 412. Each one of the plurality of transceivers 212 is communicatively coupled to at least one respective antenna from a plurality of antennas 214 via communication links 422, 418 and 414. The communication links 408, 410, 412, 422, 418 and 414 may be implemented as wired communication links, such as Ethernet type communication links.

Generally speaking, a given transceiver is an electronic device that is able to receive/transmit information and is usually communicatively coupled with at least one antenna when communications are to be received/transmitted wirelessly thereby. How transceivers and antennas operate is generally known in the art and will not be described herein in length.

However, it should be noted that each transceiver of the plurality of transceivers 212 and the at least one respective antenna from the plurality of antennas 214 are designed to receive/transmit radio waves at specific frequencies and are dedicated for respective ones of the plurality of external source systems 110.

For example, a transceiver 206 and an antenna 216 may be dedicated for transmitting/receiving information to/from the external data source system 116. In other words, once the communication link 424 is established between the external data source system 116 and the on-board communication system 104, information may be transmitted/received to/from the external data source system 116 via a combination of the antenna 216 and the transceiver 206.

As previously alluded to, the external data source system 116 may be a given ground-type data source system. In this case, the transceiver 206 may be an ATG transceiver and the antenna 216 may be an ATG antenna operating at about 950 MHz, for example, and in combination with the external data source system 116, may be part of or form an ATG data communication system of the vehicle 102.

In another example, a transceiver 208 and an antenna 218 are dedicated for transmitting/receiving information to/from the external data source system 118. As previously alluded to, the external data source system 118 may be a first satellite-type data source system providing wireless communication over the SBB spectrum. In this case, the transceiver 208 may be a SBB transceiver and the antenna 218 may be a SBB antenna operating at about 1.62 GHz, for example, and in combination with the external data source system 118, may be part of or form a SATCOM data system of the vehicle 102.

In yet a further example, a transceiver 210 and an antenna 220 are dedicated for transmitting/receiving information to/from the external data source system 120. As previously alluded to, the external data source system 120 may be a second satellite-type data source system providing wireless communication over the Ka band spectrum. In this case, the transceiver 210 may be a Ka band transceiver and the antenna 220 may be a Ka band antenna operating at about 21 to 31 GHz, for example, and in combination with the external data source system 118, may be part of or form another SATCOM data system of the vehicle 102.

Figure 3:
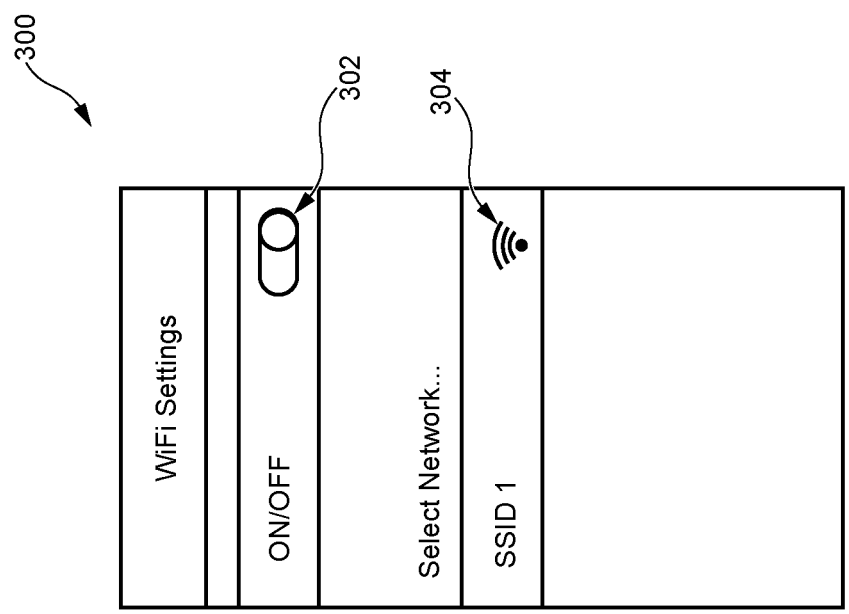
FIG. 3 depicts a representation of a display of the device of FIG. 1 during connection of the device to an on-board local area network according to some implementations of the present technology.

How the user 101 may connect the device 106 to the on-board local area network 105 and how the communication link 402 between the device 106 and the on-board communication system 104 is established will now be described with reference to FIG. 3. There is depicted a representation 300 of a display of the device 106 according to some embodiments of the present technology. It should be noted that the representation 300 of the display of the device 106 is simplified for sake of explanation only and, in other implementations of the present technology, may comprise more interface elements than those depicted in FIG. 3.

Let it be assumed that the device 106 is a wireless device such as a smartphone, for example. Let it also be assumed that the network access point 108 is a wireless access point providing wireless access to the on-board local area network 105.

The user 101 may select "WiFi® settings" of the device 106 and the representation 300 may be displayed to the user 101 by the device 106. The user 101 may be enabled to turn on/off the WiFi® connectivity function of the device 106 by interacting with (such as by tapping or toggling, for example) an interface switch 302. It is contemplated that other types of interfaces switches may be used in some implementations of the present technology.

Once the WiFi® connectivity function of the device 106 is turned on, the device 106 begins discovering networks available for connection to the device 106. In other words, the device 106 may capture a WiFi signal emitted by the network access point 108 which may be instrumental for discovering the on-board local area network 105 by the device 106. In this case, the device 106 may discover the on-board local area network 105. In some embodiments of the present technology, the device 106 on-board the vehicle 102 may discover only the on-board local area network 105.

Once the device 106 discovers the on-board local area network 105, a network-selection interface element 304 may appear on the display of the device 106. In this case, the on-board local area network 105 is identified by "SSID1" as depicted in FIG. 3. The user 101 may then interact with the network-selection interface element 204 in order to connect the device 106 to the on-board local area network 105. Once the device 106 is connected to the on-board local area network 105 (via the network access point 108), the device 106 is communicatively coupled with the on-board communication system 104 via the communication link 402 (See FIG. 2 for example). In other words, when the device 106 is connected to the on-board local area network 105, the communication link 402 between the router 202 of the on-board communication system 104 and the device 106 may be established.

Returning to FIG. 2, execution of at least some functionalities of the on-board communication system 104 will now be described. Let it be assumed that the communication link 402 is established between the device 106 and the router 202 via the network access point 108. In other words, the device 106 is communicatively coupled to the router 202 via the on-board local area network 105. Let it also be assumed that the vehicle 102 is an aircraft that is flying over a geographical land region when the user 101 selects a given one of the plurality of applications 107 for streaming a media file via the internet, such as a song for example.

To that end, the router 202 may establish a first communication channel 460 for transmitting an information stream which, in this case, is representative of the media file being the song. The first communication channel 460 may be established by the router 202 between the user device 106 and the external data source system 116. This means that the router 202 may establish the first communication channel 460 between a given ground-type external data source system and the device 106. The first communication channel 460 is formed by the communication link 402 (e.g., communicative coupling of the device 106 with the router 202 via the on-board local area network 105) and the communication links 408, 422 and 424. In this case, the device 106 may be connected and has access to the internet via the external data source system 116.

The router 202 may be configured to transmit the information stream (representative of the media file) associated with the device 106 via the first communication channel 460. Put another way, information may be transmitted by the router 202 from the external data source system 116 to the device 106 via the first communication channel 460.

In some embodiments of the present technology, the router 202 may also establish a second, third and local communication channels 470, 480 and 450, respectively.

For example, the second communication channel 470 may be established by the router 202 between the user device 106 and the external data source system 118. This means that the router 202 may establish the second communication channel 470 between a given satellite-type external data source system and the device 106. The second communication channel 470 is formed by the communication link 402 (e.g., communicative coupling of the device 106 with the router 202 via the on-board local area network 105) and the communication links 410, 418 and 420.

In another example, the third communication channel 480 may be established by the router 202 between the user device 106 and the external data source system 120. This means that the router 202 may establish the third communication channel 480 between another given satellite-type external data source system and the device 106. The third communication channel 480 is formed by the communication link 402 (e.g., communicative coupling of the device 106 with the router 202 via the on-board local area network 105) and the communication links 412, 414 and 416.

In yet a further example, the local communication channel 450 may be established by the router 202 between the user device 106 and the on-board management system 204. This means that the router 202 may establish the local communication channel 450 between a given CMS of the aircraft (vehicle 102) and the device 106. The local communication channel 450 is formed by the communication link 402 (e.g., communicative coupling of the device 106 with the router 202 via the on-board local area network 105) and the communication link 406.

It should be noted that the on-board communication system 104 is a fully integrated communication system of the vehicle 102 due to the capability of the router 202 to establish the first, second, third and local communication channels 460, 470, 480 and 450, respectively, for allowing the device 106 to be communicatively coupled with any one of the plurality of external data source systems 110 and the on-board management system 204.

The router 202 is also configured to monitor a plurality of decision metrics for the plurality of external data source systems 110. For example, the router 202 may be configured to monitor decision metrics such as, but not limited to, data rates, connection strengths, and operation ranges for each one of the plurality of external data source systems 110. In other words, for each one of the plurality of external data source systems 110, the router 202 may be configured to keep track and record values of data rates, connection strengths, operation ranges and the like.

In some embodiments of the present technology, the router 202 may also be configured to monitor a plurality of other decision metrics associated with the vehicle 102. For example, the router 202 may be configured to monitor decision metrics such as, but not limited to, an altitude of the vehicle 102 and a geographical region above which the vehicle 102 is operating. In other words, the router 202 may be configured to keep track and record values of altitude and geographical location of the vehicle 102.

It should be understood that the values of the plurality of decision metrics associated with the plurality of external data source systems 110 and/or the values of the plurality of other decision metrics associated with the vehicle 102 may vary over time.

For example, the values of the plurality of decision metrics associated with the plurality of external data source systems 110 and/or the values of the plurality of other decision metrics associated with the vehicle 102 may vary if the vehicle 102 is no longer flying over a geographical land region but is flying over a geographical water region.

In another example, the values of the plurality of decision metrics associated with the plurality of external data source systems 110 and/or the values of the plurality of other decision metrics associated with the vehicle 102 may vary depending on the current weather in which the vehicle 102 is operating.

It is contemplated, that the router 202 may record, continuously or at pre-determined intervals of times, the values of the plurality of decision metrics associated with the plurality of external data source systems 110 and/or the values of the plurality of other decision metrics associated with the vehicle 102. The router 202 may transmit the so-recorded values to the storage 201 for storage thereof.

It is also contemplated that the values of the plurality of decision metrics associated with the plurality of external data source systems 110 and/or the values of the plurality of other decision metrics associated with the vehicle 102 may be used by the router 202 in order to determine which one of the plurality of external data source systems 110 is better suited for transmitting the information stream.

The plurality of decision metrics and/or the plurality of other decision metrics may be indicative of a respective priority parameter for each one of the plurality of external data source systems 110.

The values of the plurality of decision metrics associated with the plurality of external data source systems 110 and/or the values of the plurality of other decision metrics associated with the vehicle 102 may influence the selection of a given one of the plurality of external source systems 110 for transmitting the information stream.

In some embodiment of the present technology, the router 202 may be configured to compute the respective priority parameter for each one of the plurality of external data source systems 110 based on respective values of the plurality of decision metrics and/or of the another plurality of other decision metrics.

It is contemplated that, in order to compute the respective priority parameter for each one of the plurality of external data source systems 110, the router 202 may execute the external-data-source-system-monitoring algorithm and/or the vehicle-monitoring algorithm stored in the storage 201.

For example, by executing the external-data-source-system-monitoring algorithm and/or the vehicle-monitoring algorithm, the router 202 may be configured to compute the respective priority parameter for each one of the plurality of external data source systems 110 as a weighted sum of any combination of the values of at least one of the plurality of decision metrics associated with the plurality of external data source systems 110 and/or the values of at least one of the plurality of other decision metrics associated with the vehicle 102.

It is contemplated that the priority parameters may be indicative of how respective external data source systems of the plurality of external data source systems 110 are suited for transmission of the information stream associated with the device 106. As such, recalling that the information stream is being transmitted via the first communication channel 460, the router 202 may be configured to identify a given one of the plurality of external data source systems 110 to be prioritized over the external data source system 116 associated with the first communication channel 460.

The identification of the given one of the plurality of external data networks 110 may be executed by the router 202 based on the respective priority parameters of each one of the plurality of external data source systems 110.

In some embodiments of the present technology, in order to identify the given one of the plurality of external data source systems 110 that is to be prioritized, the router 202 may be configured to rank the plurality of external data source systems 110 based on the respective priority parameters. As such, the most suited external data source system of the plurality of external data source systems 110 for transmitting the information stream associated with the device 106 may be associated with a highest of all priority parameters, while the less suited external data source system of the plurality of external data source systems 110 for transmitting the information stream associated with the device 106 may be associated with a lowest of all priority parameters.

Therefore, in some embodiments of the present technology, in order to identify the given one of the plurality of external data source systems 110 that is to be prioritized, the router 202 may be configured to select a top ranked external data source system of the plurality of external data source systems 110 as the most suited external data source system of the plurality of external data source systems 110 for transmitting the information stream associated with the device 106. In other words, the router 202 may select the top ranked external data source system of the plurality of external data source system 110 as the given one of the plurality of external data networks to be prioritized over the external data source system 116 for transmitting the information stream associated with the device 106.

In some embodiments of the present technology, the router 202 may be configured to switch from the first communication channel 460 associated with the external data source systems 116 (which is currently used to transmit the information stream associated with the device 106) to another communication channel associated with the given one of the plurality of external data source systems 110 that is to be prioritized for transmitting the information stream (e.g., the most suited external data source system for transmission of the information stream).

Let it be assumed that the given one of the plurality of external data networks 110 that is to be prioritized by the router 202 for transmitting the information stream associated with the device 106 is the external data source system 118. Indeed, the priority parameter associated with the external data source system 118 may be ranked higher by the router 202 than the priority parameter associated with the external data source system 116.

In order to switch from the first communication channel 460 to the another communication channel associated with the given one of the plurality of external data source systems 110 that is to be prioritized for transmitting the information stream, the router 202 may be configured to establish the second communication channel 470 for transmitting the information stream via the external data source system 118. The second communication channel 470 may be established by the router 202 between the user device 106 and the external data source system 118. This means that the router 202 may establish the second communication channel 470 between a given satellite-type data source system and the device 106.

As previously alluded to, the second communication channel 470 is formed by the communication link 402 (e.g., communicative coupling of the device 106 with the router 202 via the on-board local area network 105) and the communication links 410, 418 and 420. In this case, the device 106 may be connected and have access to the internet via the external data source system 118.

According to some embodiments of the present technology, in order to switch from the first communication channel 460 to the another communication channel associated with the given one of the plurality of external data source systems 110 that is to be prioritized for transmitting the information stream (in this example, the second communication channel 470), the router 202 is also configured to store at least a portion of the information stream associated with the device 106 in the storage 201. For example, while the information stream is being transmitted via the first communication channel 460, the router 202 may load the at least the portion of the information stream as buffer data and store it in the storage 201.

In some embodiments, the router 202 may be configured to load a pre-determined volume of the information stream as the buffer data and may store the pre-determined volume of the information stream in the storage 201.

It should be understood that the switching from the first communication channel 460 to the second communication channel 470 for transmitting the information stream associated with the device 106 is seamless to the user 101 of the device 106. In other words, the user 101 is not aware of the router 202 switching the transmission of the information stream from the external data source system 116 to the external data source system 118. This switching is executed automatically by the router 202 without the user 101 manually selecting, switching or otherwise explicitly interacting with the device 106 for connecting the device 106 to any other network than to the already connected on-board local area network 105.

The router 202 is also configured to continue transmission of the information stream via the second communication channel 470 instead of via the first communication channel 460. In other words, the information representative of the media file may, at first, be transmitting to the device 106 via the first communication channel 460 and, then, once the router 202 switches from the first communication channel 460 to the second communication channel 470, the information representative of the media file may be transmitting to the device 106 via the second communication channel 470.

It should be noted that the transmission via the second communication channel 470 may be executed by the router 202 such that the information stream is uninterrupted during the switching from the first communication channel 460 to the second communication channel 470. This uninterruption of the information stream during the switching from the first communication channel 460 to the second communication channel 470 may be achieved by the router 202 using the at least the portion of the information stream stored in the storage 201. For example, the router 202 may retrieve the at least the portion of the information stream from the storage 201 and transmit it to the device 106 while a switching period that it takes for the router to establish the second communication channel. Once the the switching from the first communication channel 460 to the second communication channel 470 is completed, the router 202 may continue transmission of the information stream from the second external data source system 118.

This means that if the user 101 is streaming the song from the internet, during the switching from the first communication channel 460 to the second communication channel 470, the song being listened by the user 101 may be uninterrupted since the router 202 may transmit to the device 106 the buffer data from the storage 201, which has been previously received by the router 202 via the external data source system 116 and previously stored in the storage 201.

As previously alluded to, the user 101 may control the at least some functionalities of the vehicle 102 via the device 106. How the user 101 may control the at least some functionalities of the vehicle 102 via the device 106 will now be described.

In some embodiments of the present technology, the user 101 may interact with the device 106 which, in response, may execute an on-board management system application associated with the on-board management system 204. It is contemplated the the plurality of applications 107 (see FIG.

1 for example) may comprise the on-board management system application. The execution of the on-board management system application by the device 106 may trigger the router 202 to establish the local communication channel 450 between the device 106 and the on-board management system 204. The local communication channel 450 is formed by the communication link 402 (e.g., communicative coupling of the device 106 with the router 202 via the on-board local area network 105) and the communication link 406.

As such, the device 106 may be connected and have access to the on-board management system 204 via the router 202. This may enable the user 101 to use the on-board management system application for transmitting instructions for the on-board management system 204 via the local communication channel 450 in order to control the at least one of the at least some functionalities inside the vehicle 102.

Figure 4:
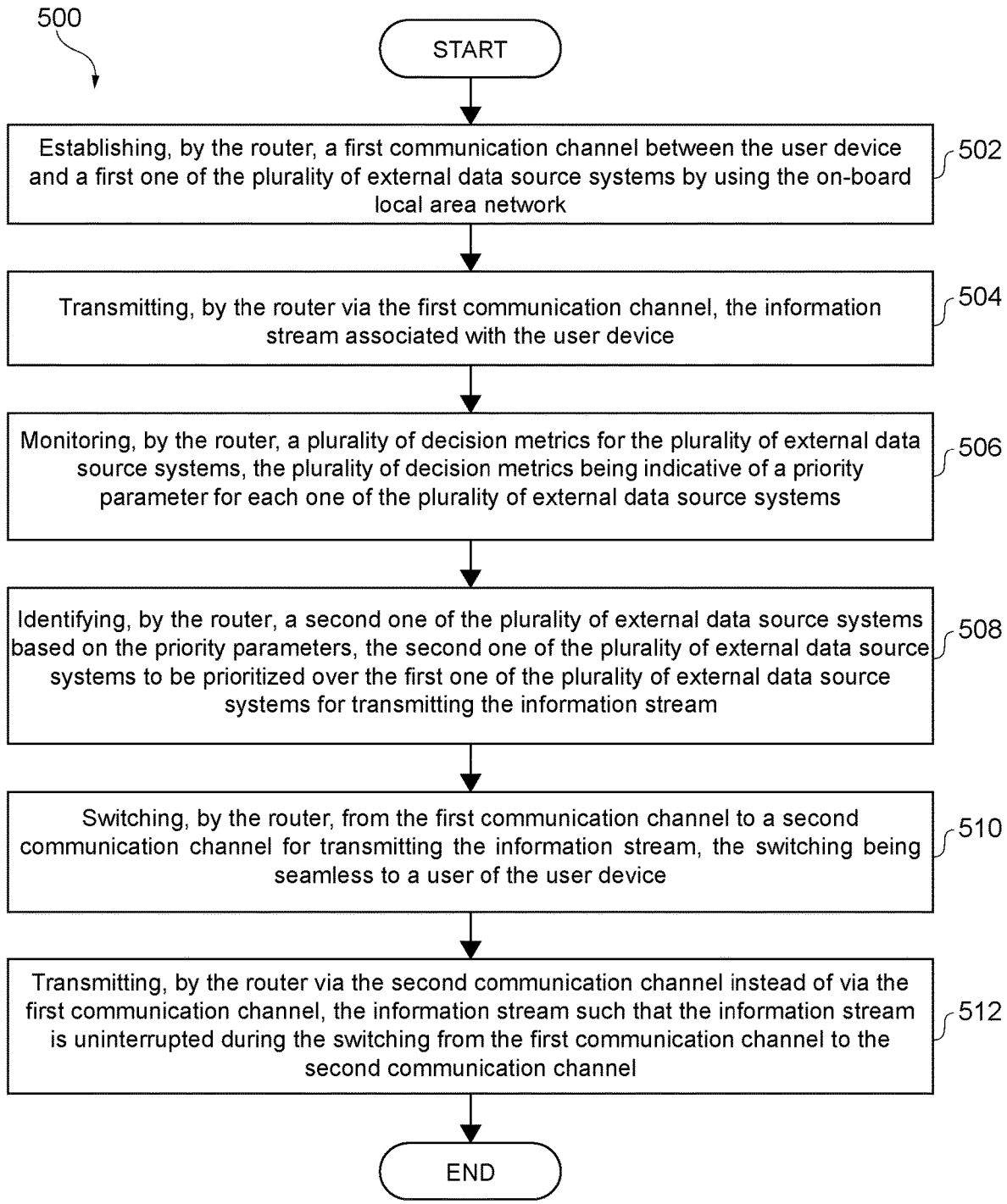
FIG. 4 is a scheme-block representation of a method of transmitting the information stream associated with the device according to some implementations of the present technology.

With reference to FIG. 4, there is depicted a schematic representation of a method 500 for transmitting the information stream associated with the device 106 according to some embodiments of the present technology. The method 500 will now be described in greater details.

STEP 502: establishing, by the router, a first communication channel between the user device and a first one of the plurality of external data source systems by using the on-board local area network The method 500 begins at step 502 with the router 202 establishing a first given communication channel between the device 106 and a first given one of the plurality of external data source systems 110 by using the on-board local area network 105. For example, the router 202 may establish any one of the first, second and third communication channels 460, 470 and 480.

In some embodiments, the on-board local area network 1o5 is a Wifi network provided on-board of the vehicle 102.

In other embodiments, the plurality of external data source systems 110 may comprise at least one external data source system being of the ground-type and at least one other external data source system being of the satellite-type.

STEP 504: transmitting, by the router via the first communication channel, the information stream associated with the user device The method 500 continues to step 504 with the router 202 transmitting via the first given communication channel the information stream associated with the device 106. For example, the router 202 may use the first given communication channel established at step 502 for transmitting the information stream.

STEP 506: monitoring, by the router, a plurality of decision metrics for the plurality of external data source systems, the plurality of decision metrics being indicative of a priority parameter for each one of the plurality of external data source systems The method 500 continues to step 506 with the router 202 monitoring the plurality of decision metrics associated with the plurality of external data source systems 110. It is contemplated that the plurality of decision metrics may be indicative of the priority parameter for each one of the plurality of external data source systems 110.

In some embodiment of the present technology, the router 202 may compute the respective priority parameter for each one of the plurality of external data source systems 101 based on respective values of the plurality of decision metrics.

In some embodiments, the respective priority parameter may be a weighted sum of the respective values of the plurality of decision metrics.

In some embodiments, the plurality of decision metrics associated with the plurality of external data source systems 110 may comprise at least one of: a data rate metric, a connection strength metric and an operation range metric.

In other embodiments, the router may monitor the plurality of other decision metrics associated with the vehicle 102. The plurality of decision metrics and the plurality of the other decision metrics may be indicative of the respective priority parameter for each one of the plurality of external data source systems 110.

In further embodiments, the plurality of the other decision metrics associated with the vehicle 102 may comprise at least one of an altitude of the vehicle and an geographical region of the vehicle.

STEP 508: identifying, by the router, a second one of the plurality of external data source systems based on the priority parameters, the second one of the plurality of external data source systems to be prioritized over the first one of the plurality of external data source systems for transmitting the information stream The method continues to step 508 with the router 202 identifying a second given one of the plurality of external data source systems 110 based on the priority parameters of the respective ones of the plurality of external data source systems 11. It should be noted that the second given one of the plurality of external data source systems 110 is to be prioritized over the first given one of the plurality of external data source systems 110 for transmitting the information stream.

In some embodiments of the present technology, in order to identify the second given one of the plurality of external data source systems 110, the router 202 may rank each one of the plurality of external data source systems 110 based on the respective priority parameter.

In other embodiments of the present technology, in order to identify the second given one of the plurality of external data source systems 110, the router 202 may select the top ranked external data source system as the second given one of the plurality of external data source systems 110.

STEP 510: switching, by the router, from the first communication channel to a second communication channel for transmitting the information stream, the switching being seamless to a user of the user device The method 500 continues to step 510 with the router 202 switching from the first given communication channel to a second given communication channel for transmitting the information stream. It is contemplated that the switching is seamless to the user 101 of the device 106. In other words, the user 101 may not need to manually interface with the device 106 for switching from the first given to the second given communication channel.

In order to switch from the first given to the second given communication channel, the router 202 may establish the second given communication channel between the device 106 and the second given one of the plurality of external data source systems 110 by using the on-board local area network 105.

In order to switch from the first given to the second given communication channel, the router 202 may store the at least a portion of the information stream (e.g., buffer data) in the storage 201. In some embodiments, the at least the portion of the information stream may be the pre-determined volume of the information stream.

STEP 512: transmitting, by the router via the second communication channel instead of via the first communication channel, the information stream such that the information stream is uninterrupted during the switching from the first communication channel to the second communication channel The method 500 ends with the router 202 transmitting, via the second given communication channel instead of via the first given communication channel, the information stream such that the information stream is uninterrupted during the switching from the first given communication channel to the second given communication channel.

In some embodiments of the present technology, the at least the portion of the information stream stored in the storage 201 may be used by the router 202 for the transmitting the information stream via the second given communication channel instead of via the first given communication channel such that the information stream is uninterrupted during the switching from the first given communication channel to the second given communication channel.

In other embodiments, the router 202 may further establishing the local communication channel 450 between the device 106 and the on-board management system 204 by using the on-board local area network 105. It is contemplated that the local communication channel 450 may be established by router 202 instead of and/or simultaneously to any combination of the first, second and third communication channels 460, 470 and 480.

If further embodiments, the router 202 may transmit via the local communication channel 450 instructions provided by the user 101 for controlling at least one functionality of the vehicle 102.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of transmitting an information stream associated with a user device, the method executable by a router, the router and the user device being located on-board a vehicle and being communicatively coupled by an on-board local area network, the router being further communicatively coupled to a plurality of external data source systems and a storage, the method comprising:
   establishing, by the router, a first communication channel between the user device and a first one of the plurality of external data source systems by using the on-board local area network;
   transmitting, by the router via the first communication channel, the information stream associated with the user device;
   monitoring, by the router, a plurality of decision metrics for the plurality of external data source systems, the plurality of decision metrics being indicative of a priority parameter for each one of the plurality of external data source systems;
   identifying, by the router, a second one of the plurality of external data source systems based on the priority parameters, the second one of the plurality of external data source systems to be prioritized over the first one of the plurality of external data source systems for transmitting the information stream;
   switching, by the router, from the first communication channel to a second communication channel for transmitting the information stream, the switching being seamless to a user of the user device, the switching comprises:
   establishing, by the router, a second communication channel between the user device and the second one of the plurality of external data source systems by using the on-board local area network; and
   storing, by the router, at least a portion of the information stream in the storage; and
   transmitting, by the router via the second communication channel instead of via the first communication channel, the information stream such that the information stream is uninterrupted during the switching from the first communication channel to the second communication channel.

2. The method claim 1, wherein the method further comprises:
   computing, by the router, the respective priority parameter for each one of the plurality of external data source systems based on respective values of the plurality of decision metrics, the respective priority parameter being a weighted sum of the respective values of the plurality of decision metrics.

3. The method of claim 1, wherein the identifying the second one of the plurality of external data source systems based on the priority parameters comprises:
   ranking, by the router, each one of the plurality of external data source systems based on the respective priority parameter; and
   selecting, by the router, a top ranked external data source system as the second one of the plurality of external data source systems.

4. The method of claim 1, wherein the at least the portion of the information stream stored in the storage is used, by the router, for the transmitting the information stream via the second communication channel instead of via the first communication channel such that the information stream is uninterrupted during the switching from the first communication channel to the second communication channel.

5. The method of claim 1, wherein the method further comprises:
   establishing, by the router, a local communication channel between the user device and a on-board management system by using the on-board local area network; and
   transmitting, by the router via the local communication channel, instructions provided by the user for controlling at least one functionality of the vehicle.

6. The method of claim 1, wherein the on-board local area network is a Wifi network provided on-board of the vehicle.

7. The method of claim 1, wherein the plurality of external data source systems comprises at least one external data source system being of a ground-type and at least one other external data source system being of a satellite-type.

8. The method of claim 1, wherein the at least the portion of the information stream is a pre-determined volume of the information stream.

9. The method of claim 1, wherein the plurality of decision metrics comprises at least one of:
   a data rate metric;
   a connection strength metric; and
   an operation range metric.

10. The method of claim 1, wherein the method further comprises monitoring, by the router, a plurality of other decision metrics associated with the vehicle, and wherein the plurality of decision metrics and the plurality of the other decision metrics are indicative of the respective priority parameter for each one of the plurality of external data source systems.

11. The method of claim 10, wherein the plurality of the other decision metrics comprises at least one of:

an altitude of the vehicle; and
a geographical region of the vehicle.

12. A networking device for transmitting an information stream associated with a user device, the networking device and the user device being located on-board a vehicle and being communicatively coupled by an on-board local area network, the networking device being further communicatively coupled to a plurality of external data source systems and to a storage storing configuration files, when the networking device executes the configuration files the networking device being configured to:
  establish a first communication channel between the user device and a first one of the plurality of external data source systems by using the on-board local area network;
  transmit, via the first communication channel, the information stream associated with the user device;
  monitor a plurality of decision metrics for the plurality of external data source systems, the plurality of decision metrics being indicative of a priority parameter for each one of the plurality of external data source systems;
  identify a second one of the plurality of external data source systems based on the priority parameters, the second one of the plurality of external data source systems to be prioritized over the first one of the plurality of external data source systems for transmitting the information stream;
  switch from the first communication channel to a second communication channel for transmitting the information stream, the switching being seamless to a user of the user device, the networking device configured to switch comprises the networking device being configured to:
    establish a second communication channel between the user device and the second one of the plurality of external data source systems by using the on-board local area network; and
    store at least a portion of the information stream in the storage; and
  transmit, via the second communication channel instead of via the first communication channel, the information stream such that the information stream is uninterrupted during the switching from the first communication channel to the second communication channel.

13. The networking device of claim 12, wherein the networking device is further configured to:
  compute the respective priority parameter for each one of the plurality of external data source systems based on respective values of the plurality of decision metrics, the respective priority parameter being a weighted sum of the respective values of the plurality of decision metrics.

14. The networking device of claim 12, wherein the networking device configured to identify the second one of the plurality of external data source systems based on the priority parameters is further configured to:
  rank each one of the plurality of external data source systems based on the respective priority parameter; and
  select a top ranked external data source system as the second one of the plurality of external data source systems.

15. The networking device of claim 12, wherein the networking device is configured to use the at least the portion of the information stream stored in the storage for transmitting the information stream via the second communication channel instead of via the first communication channel such that the information stream is uninterrupted during switching from the first communication channel to the second communication channel.

16. The networking device of claim 12, wherein the networking device is further configured to:
  establish a local communication channel between the user device and a on-board management system by using the on-board local area network; and
  transmit, via the local communication channel, instructions provided by the user for controlling at least one functionality of the vehicle.

17. The networking device of claim 12, wherein the on-board local area network is a Wifi network provided on-board of the vehicle.

18. The networking device of claim 12, wherein the plurality of external data source systems comprises at least one external data source system being of a ground-type and at least one other external data source system being of a satellite-type.

19. The networking device of claim 12, wherein the at least the portion of the information stream is a pre-determined volume of the information stream.

20. The networking device of claim 12, wherein the plurality of decision metrics comprises at least one of:
  a data rate metric;
  a connection strength metric; and
  an operation range metric.

21. The networking device of claim 12, wherein the networking device is further configured to monitor a plurality of other decision metrics associated with the vehicle, and wherein the plurality of decision metrics and the plurality of the other decision metrics are indicative of the respective priority parameter for each one of the plurality of external data source systems.

22. The networking device of claim 21, wherein the plurality of the other decision metrics comprises at least one of:
  an altitude of the vehicle; and
  a geographical region of the vehicle.

* * * * *